UNITED STATES PATENT OFFICE.

RICHARD HAERTEL, OF BASEL, SWITZERLAND, ASSIGNOR TO THE FIRM OF F. HOFFMANN-LA ROCHE AND COMPANY, OF BASEL, SWITZERLAND.

DISINFECTANT.

996,759.     Specification of Letters Patent.     Patented July 4, 1911.

No Drawing.     Application filed February 1, 1910. Serial No. 541,292.

*To all whom it may concern:*

Be it known that I, RICHARD HAERTEL, chemist, a subject of the German Emperor, residing at Basel, Switzerland, have invented a certain new and useful Disinfectant, of which the following is a specification.

This invention relates to a disinfectant prepared from chloro-metacresol which on the base of numerous experiments is considered the best disinfectant among the phenol group. Hitherto the practical utilization of this compound has been impeded by its low solubility in water.

I have found that it is possible to obtain preparations, which form clear solutions with water, by adding glycerin and alcohol to a solution of chloro-metacresol and soap. The favorable effect of glycerin and alcohol could not be predicted, especially as the addition of glycerin alone will not produce the desired effect. In preparing concentrated solutions of chloro-metacresol the contents of water of the soap is to be diminished by heating on a water-bath, because by employing the usual potassium soap (containing 40 to 50 per cent. of water) it is impossible to obtain a higher concentration than 25 per cent. of chloro-metacresol, giving with water clear liquids.

The proportions between chloro-metacresol, soap, glycerin and alcohol may, of course, be varied within certain limits, and the water contents of the soap can be varied according to the concentration of the solution, but the proportions shown by the following examples have been found especially suitable:—

Example I, a 25 per cent. solution of chlorometacresol: 500 grams soft soap (containing 40 per cent. of water) and 250 grams of chloro-metacresol are melted on a water bath and after cooling, mixed with 175 grams of alcohol of 96 per cent. and 75 grams of glycerin. The result is a clear yellow liquid, which has at 15° C. a specific gravity of 1.052 and can be mixed with alcohol or water in any proportion.

Example II, a 40 per cent. solution of chlorometacresol: 300 grams of soft soap (containing 3.5 per cent. of water) and 400.0 grams of chloro-metacresol are melted on a water bath, and after cooling there are added 250.0 grams of alcohol of 96 per cent. and 50.0 grams of glycerin. The result is a clear yellow liquid, which has at 15° C. a specific gravity of 1.050 and gives with water a clear solution.

If the preparation obtained by the present process is distilled with dilute sulfuric acid in a current of aqueous vapor, a distillate is produced, which on strong cooling or after prolonged standing separates out crystals of chloro-metacresol. If the first distillate is mixed with several drops of benzoyl-chlorid and heated with caustic soda solution, an aromatical odor of benzoic ether is produced (thus indicating the presence of alcohol).

What I claim is:—

A disinfecting composition consisting of chloro-metacresol, soap, glycerin, alcohol and water, substantially as described.

In testimony whereof I have hereunto set my hand in presence of two subscribing witnesses.

RICHARD HAERTEL.

Witnesses:
    GEO. GIFFORD,
    ARNOLD ZUBER.